(12) United States Patent
Jankura (10) Patent No.: US 9,403,572 B2
(45) Date of Patent: Aug. 2, 2016

(54) BICYCLE FRAME WITH INTERNAL CABLE ROUTING AND METHOD FOR MAKING THE SAME

(71) Applicant: Specialized Bicycle Components, Inc., Morgan Hill, CA (US)

(72) Inventor: Robb H. Jankura, Los Gatos, CA (US)

(73) Assignee: SPECIALIZED BICYCLE COMPONENTS, INC., Morgan Hill, CA (US)

(*) Notice: Subject to any disclaimer, the term of this patent is extended or adjusted under 35 U.S.C. 154(b) by 404 days.

(21) Appl. No.: 13/933,011

(22) Filed: Jul. 1, 2013

(65) Prior Publication Data

US 2015/0004412 A1 Jan. 1, 2015

(51) Int. Cl.
*B62K 19/38* (2006.01)
*B29C 53/58* (2006.01)
(Continued)

(52) U.S. Cl.
CPC ............. *B62K 3/02* (2013.01); *B29C 70/345* (2013.01); *B62K 19/30* (2013.01); *B29C 53/72* (2013.01); *B29C 53/824* (2013.01);
(Continued)

(58) Field of Classification Search
CPC ............... B62J 2099/0046; B29L 2031/3091; B29C 53/58; B29C 53/587; B29C 53/60; B29C 53/72; B29C 53/824; B62K 3/02; B62K 19/02; B62K 19/16; B62K 19/30; B62K 19/38
USPC ......... 156/169, 171, 173, 175, 184, 189, 190, 156/191, 192, 195; 280/281.1, 288.3
See application file for complete search history.

(56) References Cited

U.S. PATENT DOCUMENTS

| | | | |
|---|---|---|---|
| 3,269,480 | A | 8/1966 | Kirby |
| 4,585,246 | A | 4/1986 | Diekman et al. |

(Continued)

FOREIGN PATENT DOCUMENTS

| | | |
|---|---|---|
| CN | 2608403 | 3/2004 |
| CN | 2705380 | 6/2005 |

(Continued)

OTHER PUBLICATIONS

Bai, J., "Advanced Fibre-Reinforced Polymer (FRP) Composited for Structural Applications", Excerpt, copyright 2013, 1 page.

(Continued)

*Primary Examiner* — Carson Gross
(74) *Attorney, Agent, or Firm* — Michael Best & Friedrich LLP (57) ABSTRACT

A method of making a portion of a bicycle frame including positioning a low-friction mandrel adjacent a flexible mandrel with a first fibrous material in between. The mandrels are wrapped with second fibrous material, and the mandrels are inserted into a mold. The second fibrous material is cured to produce a cured assembly, the cured assembly is withdrawn from the mold, and the low-friction mandrel is removed from the cured assembly to produce an internal passageway. The flexible mandrel can includes a recess, and the step of positioning can include inserting the low-friction mandrel into the recess of the flexible mandrel. Preferably, the low-friction mandrel has a cross sectional shape that substantially matches a cross-sectional shape of the recess. The invention is also embodied in a portion of a bicycle frame, such as a portion of the frame during the manufacturing process, and having similar features as recited above.

16 Claims, 9 Drawing Sheets

(51) Int. Cl.
  *B29C 53/72*   (2006.01)
  *B29C 53/82*   (2006.01)
  *B62K 3/02*    (2006.01)
  *B29C 70/34*   (2006.01)
  *B62K 19/30*   (2006.01)
  *B29L 31/30*    (2006.01)
  *B29K 105/08*   (2006.01)
  *B62J 99/00*    (2009.01)

(52) U.S. Cl.
  CPC .... *B29K 2105/0872* (2013.01); *B29K 2827/18* (2013.01); *B29K 2883/005* (2013.01); *B29L 2031/3091* (2013.01); *B62J 2099/0046* (2013.01); *B62K 19/38* (2013.01); *B62K 2700/16* (2013.01); *B62K 2700/20* (2013.01); *Y10T 428/2936* (2015.01)

(56) References Cited

U.S. PATENT DOCUMENTS

| | | | |
|---|---|---|---|
| 4,850,607 A * | 7/1989 | Trimble | 280/281.1 |
| 4,917,397 A | 4/1990 | Chonan | |
| RE33,295 E | 8/1990 | Trimble | |
| 5,215,322 A | 6/1993 | Enders | |
| 5,236,212 A | 8/1993 | Duehring et al. | |
| 5,328,194 A | 7/1994 | Buckler | |
| 5,544,907 A * | 8/1996 | Lin et al. | 280/288.3 |
| 6,340,509 B1 * | 1/2002 | Nelson et al. | 428/34.7 |
| 6,866,280 B2 | 3/2005 | Chang | |
| 7,147,238 B2 | 12/2006 | Oi | |
| 7,854,442 B2 * | 12/2010 | Onogi et al. | 280/288.3 |
| 7,891,687 B2 * | 2/2011 | Schmider | 280/281.1 |
| 7,988,175 B2 | 8/2011 | White | |
| 8,308,179 B2 | 11/2012 | Cote et al. | |
| 2003/0102647 A1 | 6/2003 | Morrone | |
| 2010/0090439 A1 | 4/2010 | White | |
| 2011/0115192 A1 | 5/2011 | Helms et al. | |
| 2013/0241169 A1 * | 9/2013 | Talavasek et al. | 280/274 |

FOREIGN PATENT DOCUMENTS

| | | |
|---|---|---|
| DE | 19533111 A1 | 3/1997 |
| DE | 29708659 | 7/1997 |
| DE | 102005039216 A1 | 2/2007 |
| DE | 202008011615 U1 | 12/2008 |
| DE | 102008054540 A1 | 6/2010 |
| EP | 2319878 A1 | 5/2011 |
| FR | 2636294 | 3/1990 |
| JP | 2009006842 | 1/2009 |
| WO | 2013091083 A1 | 6/2013 |

OTHER PUBLICATIONS

Carbonrohre Definition, http://www.smolik-velotech.de/glossar/c__CARBONROHRE.htm, Online-Glossar Velotechnik von Christian Smolik, Copyright und redaktionelle Inhalte, May 18, 2000, 1 page.
Focus Bikes, product brochure, www.focus-bikes.com, 2011, 73 pages.

* cited by examiner

BICYCLE FRAME WITH INTERNAL CABLE ROUTING AND METHOD FOR MAKING THE SAME

BACKGROUND

The present invention relates generally to the field of bicycles and specifically to bicycle frames having actuating cables positioned inside frame members.

Many bicycles have brakes for slowing the vehicle speed and shifters for changing gears. The brakes and shifters are commonly actuated by the user via brake levers and shift levers, respectively. Movement of the levers is transmitted to the brakes and shifters via a transmission member, such as wires, cables, rods, hydraulic fluid, or other suitable mechanism (hereinafter referring to as "transmission member"). These transmission members can include a movable member (e.g., a braided cable) positioned inside and movable relative to a stationary housing that guides the movable member.

In order to improve the aesthetics and aerodynamics of the bicycle, the transmission members are often routed through the interior of the bicycle frame. To facilitate this, frames can be provided with entry and exit openings that allow the transmission member to enter and exit the interior of the frame, respectively. In existing bicycles, the cables must be "fished" out of the interior, and because the interior of the frame is relatively large compared to the size of the cables, this process can be time consuming and complicated.

SUMMARY

The present invention provides a method of making a portion of a bicycle frame. The method includes positioning a low-friction mandrel (e.g., made from polytetrafluoroethylene) adjacent a flexible mandrel (e.g., made from silicone) with a first fibrous material (e.g., fibers pre-impregnated with an uncured matrix) in between the low-friction mandrel and the flexible mandrel. The flexible mandrel and low-friction mandrel are then wrapped with second fibrous material (e.g., fibers pre-impregnated with an uncured matrix), and the flexible mandrel and low-friction mandrel are then inserted into a mold. The second fibrous material is then cured to produce a cured assembly, the cured assembly is withdrawn from the mold, and the low-friction mandrel is removed from the cured assembly to produce an internal passageway.

The flexible mandrel can include a recess, and the step of positioning can include inserting the low-friction mandrel into the recess of the flexible mandrel. Preferably, the low-friction mandrel has a cross sectional shape that substantially matches a cross-sectional shape of the recess. Preferably, the flexible mandrel comprises a hollow interior, and the method further includes inserting an inflatable bladder into the hollow interior and, prior to the curing step, inflating the bladder to press the second fibrous material outward toward the mold.

The present invention is also embodied in a portion of a bicycle frame, such as a portion of the frame during the manufacturing process. The portion of the bicycle frame includes a flexible mandrel (e.g., made from silicone), a low-friction mandrel positioned adjacent the flexible mandrel, a first fibrous material (e.g., a fiber-matrix composite) positioned between the low-friction mandrel and the flexible mandrel, and a second fibrous material (e.g., a fiber-matrix composite) wrapped around the flexible mandrel and the low-friction mandrel. Preferably, the flexible mandrel comprises a recess and the low-friction mandrel is positioned in the recess. For example, the low-friction mandrel can have a cross sectional shape that substantially matches a cross-sectional shape of the recess. In one embodiment, the low-friction mandrel has a mandrel head protruding out of the recess to thereby facilitate removal of the low-friction mandrel.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
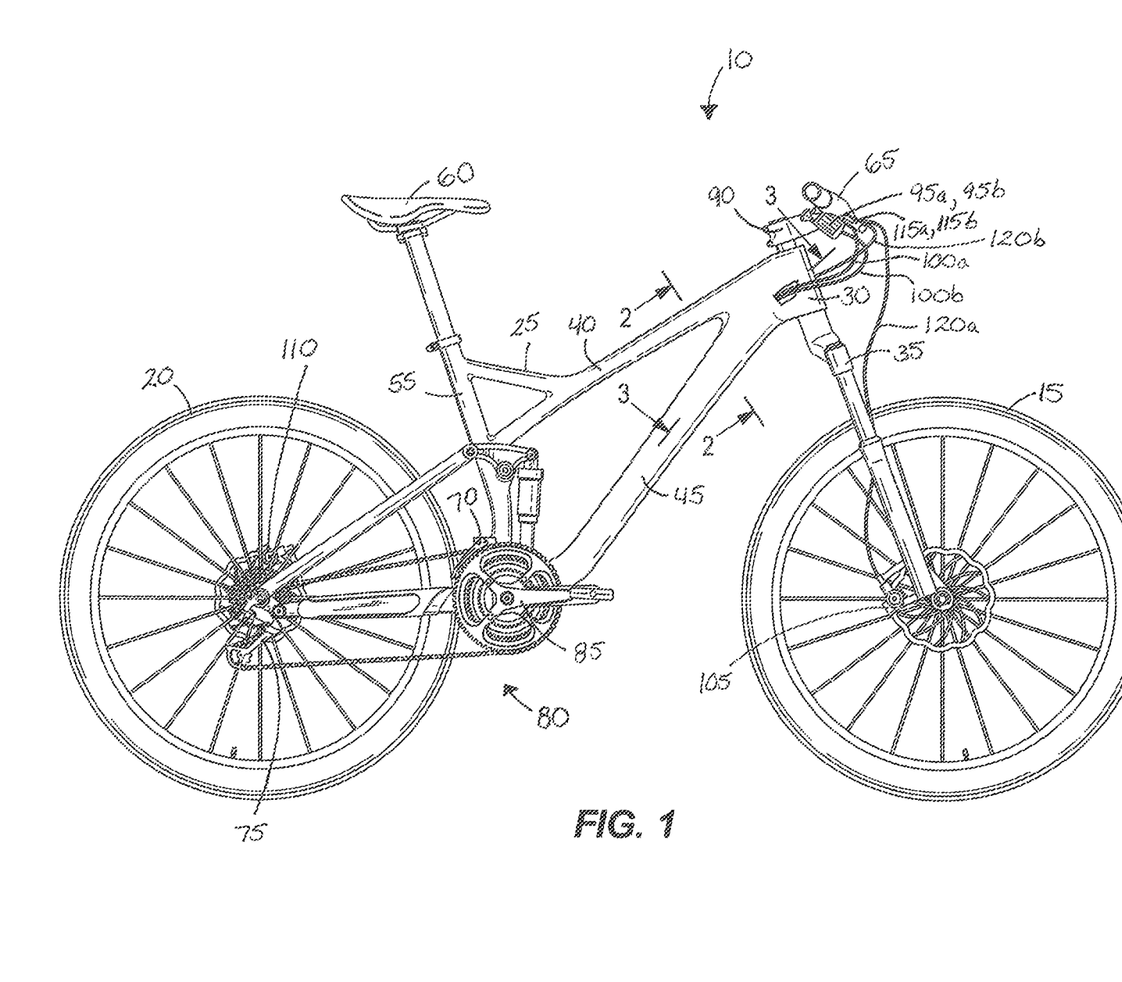
FIG. 1 is a side view of a bicycle including a frame embodying the present invention.

FIG. 1 illustrates a bicycle 10 that includes a front wheel 15, a rear wheel 20, and a frame 25. The frame 25 has a head tube 30 and a front fork 35 that is rotationally supported by the head tube 30 and that secures the front wheel 15 to the frame 10. The frame 25 also has a top tube 40 that is connected to and extends rearward from the head tube 30, and a down tube 45 that is connected to the head tube 30 below the top tube 40 and extends generally downward toward a bottom bracket of the frame 25. A seat tube 55 extends upward from the bottom bracket and is connected to the top tube 40, and a seat 60 is supported by the seat tube 55.

Figure 2:
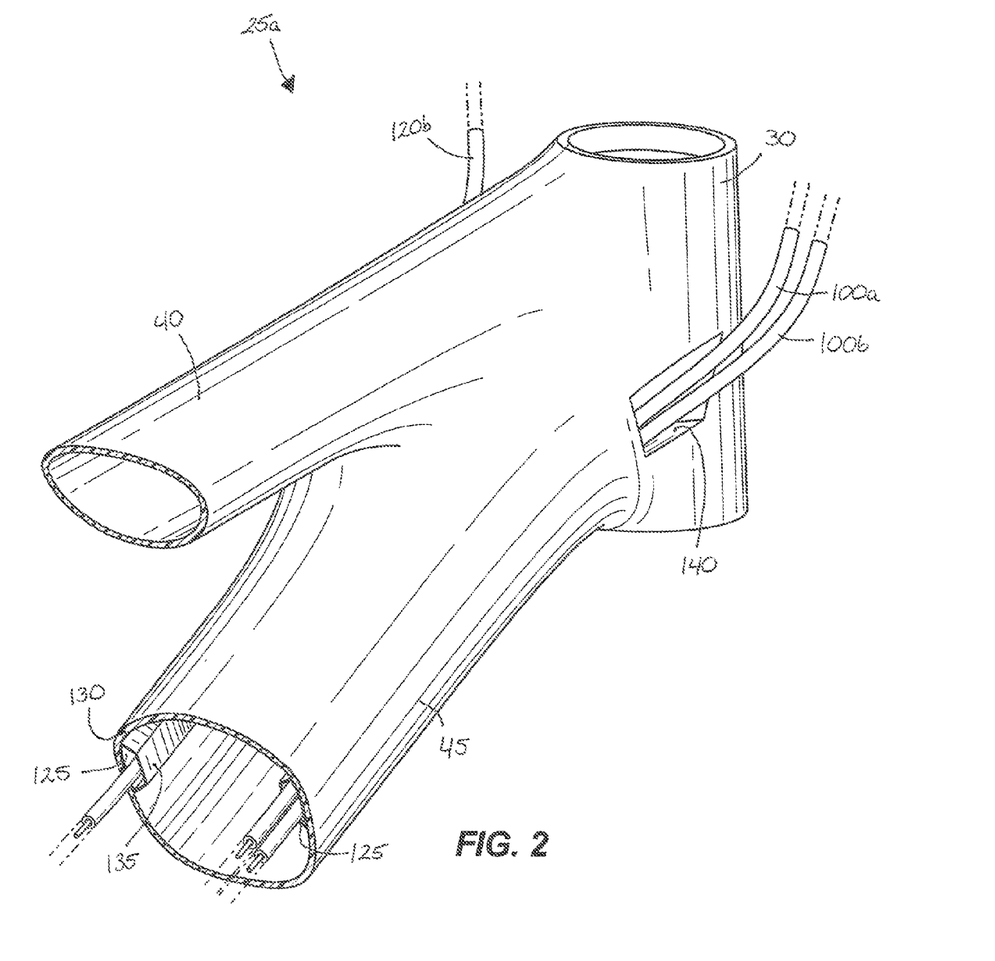
FIG. 2 is a perspective section view of a portion of the frame taken along line 2-2 in FIG. 1 and including the head tube, a portion of a top tube, and a portion of a down tube with cables routed into the down tube.

The bicycle 10 also includes a handlebar 65, a front derailleur 70, a rear derailleur 75, and a drivetrain 80 including a crankset 85 supported by the bottom bracket. The handlebar 65 is secured to the front fork 35 by a stem 90 such that movement of the handlebar 65 results in movement of the stem 90 and the fork 35. With reference to FIGS. 1 and 2, the front derailleur 70 and the rear derailleur 75 are connected to respective shift actuators 95a, 95b (e.g., shift levers) located on the handlebar 65 by respective front and rear shift cables 100a, 100b that are routed along the interior of the down tube 45. Also, a front brake 105 and a rear brake 110 are connected to respective brake actuators 115a, 115b (e.g., brake levers) located on the handlebar 65 by front and rear brake cables 120a, 120b, respectively. The brake cable 120b associated with the rear brake 110 is routed along the interior of the down tube 45 from one of the brake actuators 115a, 115b on the handlebar 65.

Figure 3:
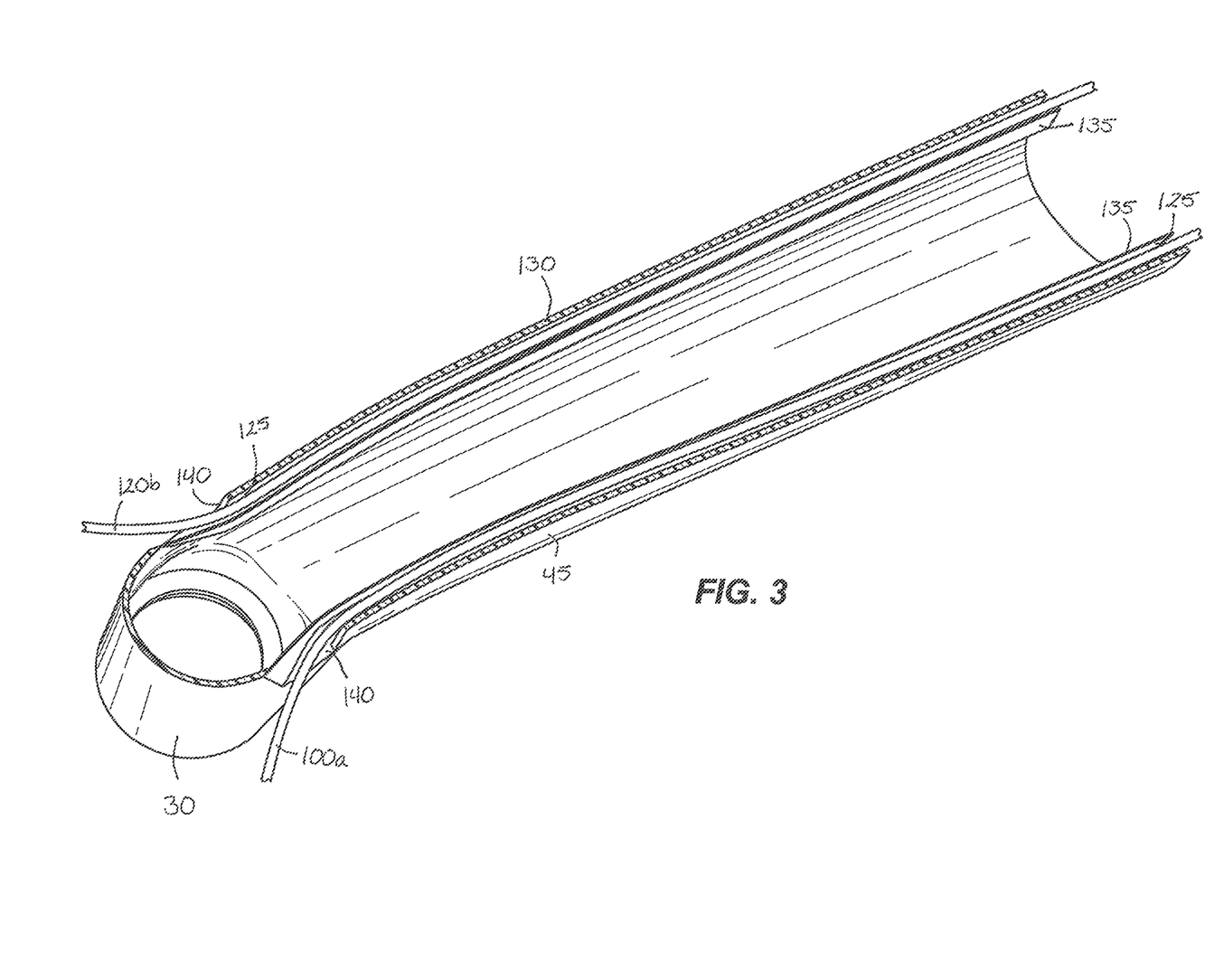
FIG. 3 is a perspective section view of a portion of the head tube and the down tube illustrating cable routing channels in the down tube.

With reference to FIGS. 2 and 3, the illustrated down tube 45 is manufactured to be hollow and to include cable passageways 125 that are disposed on the inside of the down tube 45. More specifically, the down tube 45 is defined by an outer frame wall 130 that substantially defines the hollow interior. The cable passageways 125 extend on the inside of the outer frame wall 130 longitudinally along the down tube 45 toward the bottom bracket. Each cable passageway 125 is separated from the hollow interior of the down tube 45 by an inner wall 135. As illustrated, the frame 25 has access openings 140 that are located adjacent the front end of the down tube 45 on opposite sides of the frame 25 where the down tube 45 connects with the head tube 30 so that the cables 100b, 120a, 120b can be routed into the down tube 45.

Figure 4A:
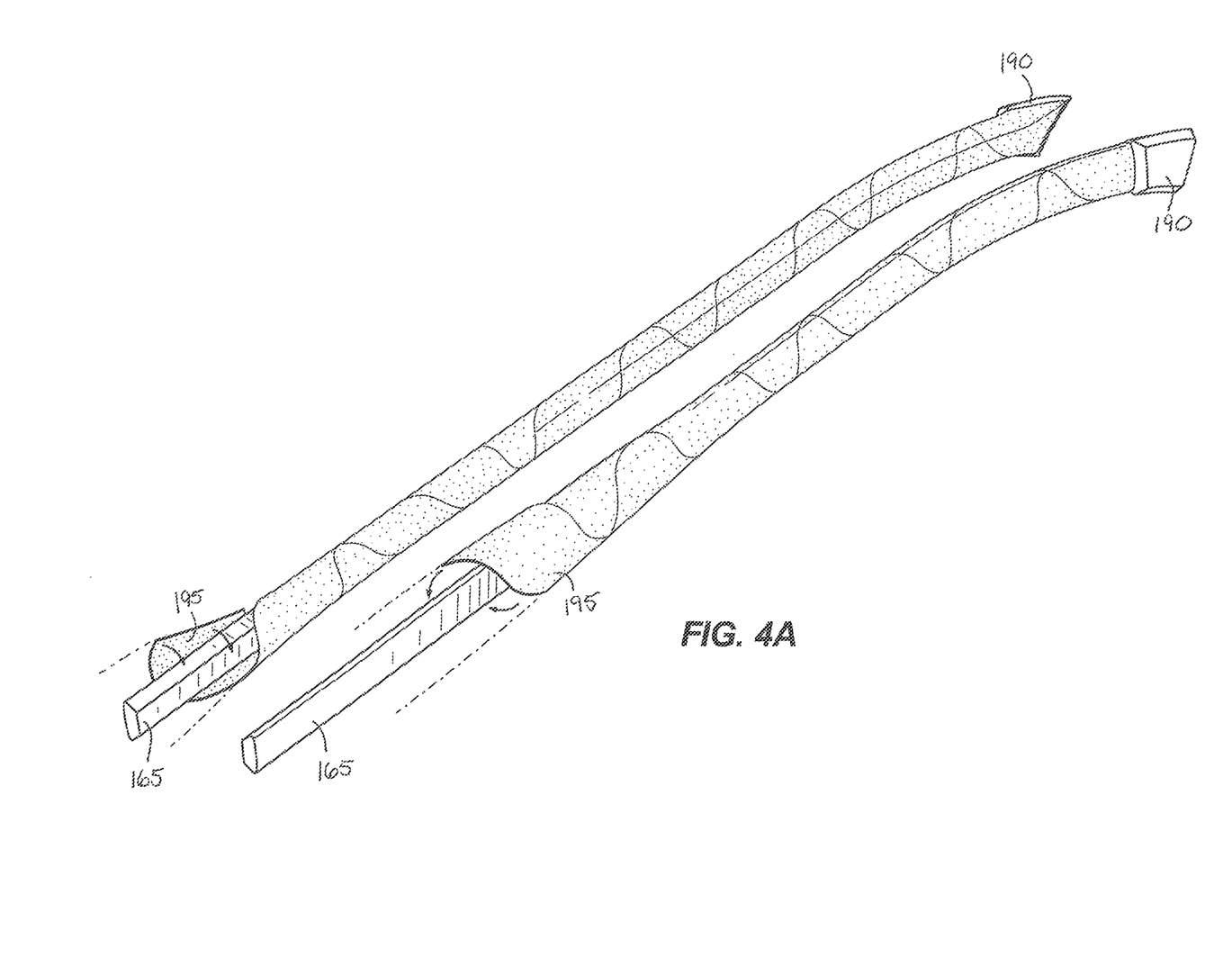
FIG. 4A is a perspective view of cable routing mandrels wrapped with fibrous material.
Figure 4B:
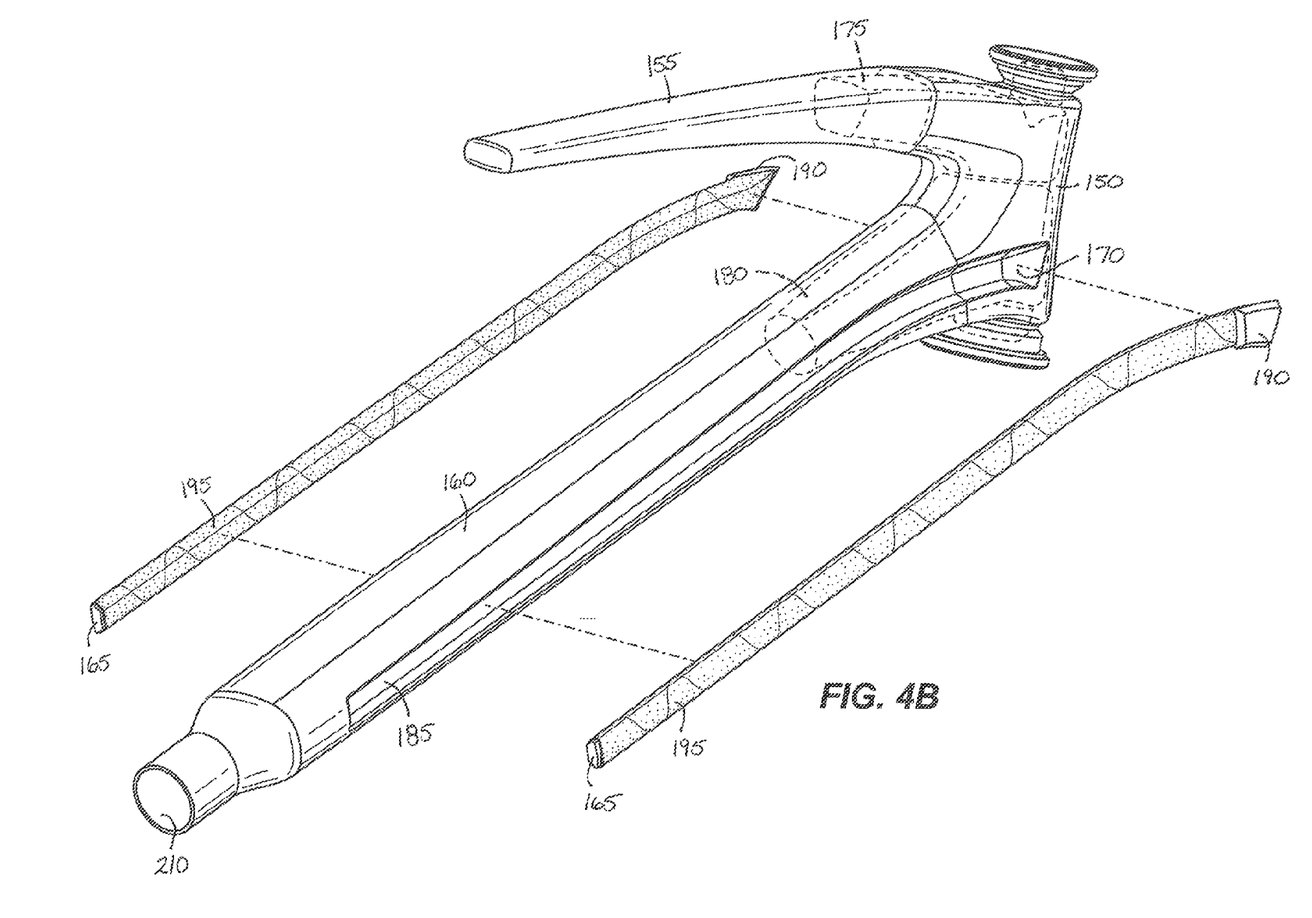
FIG. 4B is an exploded perspective view of the cable routing mandrels, a head tube mandrel, a top tube mandrel, and a down tube mandrel for forming a portion of the frame.
Figures 4C, 4D:
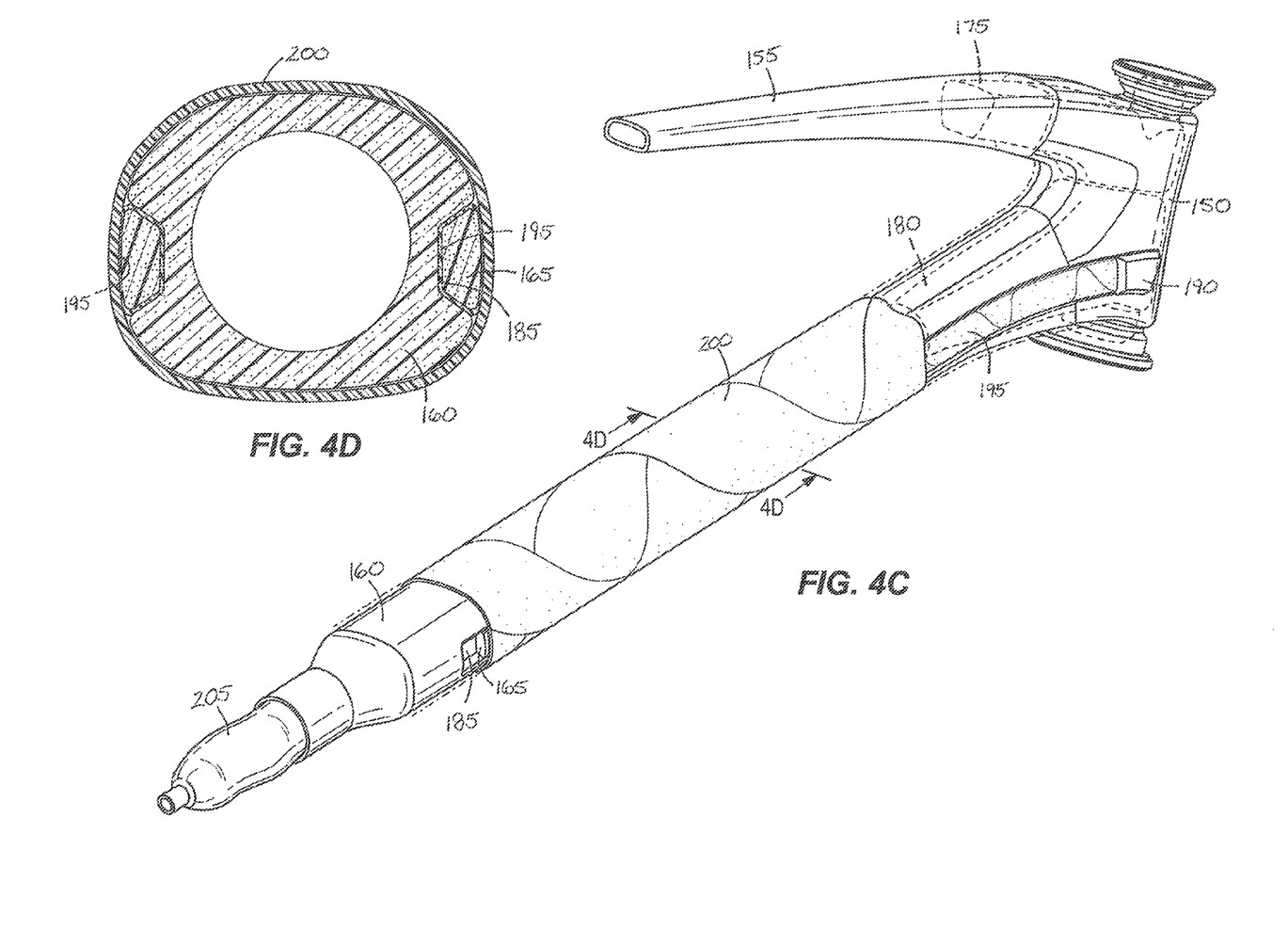
FIG. 4C is a perspective view illustrating the mandrels of FIGS. 4A and 4B assembled together with fibrous material partially wrapped around the assembled mandrels to define a preform layup.
FIG. 4D is a section view of the preform layup of FIG. 4C taken along line 4D-4D.

With reference to FIGS. 4A-4E, the frame 25 is at least partially formed of fibrous material (e.g., carbon fiber-epoxy prepreg, uncured fiber matrix composite, etc.) using a mold or curing tool 145 and mandrels that cooperatively shape the frame 25. As illustrated, the portion of the frame 25 (i.e. frame assembly 25a) defined by the head tube 30 and portions of the top tube 40 and the down tube 45 are formed using a head tube mandrel 150, a top tube mandrel 155, a down tube mandrel 160, and cable routing mandrels 165. Referring to FIGS. 4B and 4C, the head tube mandrel 150 can take the form of a single mandrel or two mandrel halves. The head tube mandrel 150 has blind recesses 170 (one shown) that are disposed on both sides of the head tube mandrel 150 and that extend from a rear end of the mandrel 150 toward the front of the mandrel 150. The illustrated blind recesses 170 are symmetrical about a central plane defined by the rear wheel 20, although the blind recesses 170 can be asymmetrical relative to the central plane. The top tube mandrel 155 is coupled to a first mandrel post 175 extending rearward from adjacent a top of the head tube mandrel 150. Also, each of the head tube mandrel 150 (or mandrel halves) and the top tube mandrel 155 is comprised of a flexible or resilient material (e.g., silicone) that can expand and contract in response to either or both pressure and heat.

With continued reference to FIGS. 4B and 4C, the down tube mandrel 160 is coupled to a second mandrel post 180 extending rearward from adjacent a lower portion of the head tube mandrel 150. The down tube mandrel 160 has recesses 185 disposed on opposite sides of the down tube mandrel 160 and is comprised of a flexible or resilient material (e.g., silicone) that can expand and contract in response to either or both pressure and heat. As illustrated, the recesses 185 align with the blind recesses 170 in the head tube mandrel 150 when the mandrels 150, 160 are attached to each other. Although the recesses 185 are illustrated as being symmetrical about the central plane, the recesses 185 can be positioned asymmetrically about the central plane. Also, one recess can be provided in lieu of two recesses (e.g., one recess along the inner bottom of the down tube 45.

As illustrated in FIGS. 4A, 4B, and 4D, each cable routing mandrel 165 is defined by an elongated body that has a cross-sectional shape that matches the cross-sectional shape of the blind recesses 170 in the head tube mandrel 150 and the recesses 185 in the down tube mandrel 160. The cable routing mandrels 165 are comprised of a low-friction material (e.g., polytetrafluoroethylene (PTFE) or Teflon) that resists expansion and contraction. That is, the cable routing mandrels 165 generally maintain their size and shape when heat or pressure (or both) is applied to the mandrel, or at least maintain their size and shape better than the silicone mandrels.

As illustrated in FIGS. 4A-4C, one end of each cable routing mandrel 165 (the end disposed adjacent the head tube 30) has a raised portion or mandrel head 190. With reference to FIGS. 1-3 and 4C, the mandrel head 190 protrudes outward from the outer surface of the head tube mandrel 150 when the cable routing mandrels 165 are coupled to the head tube and down tube mandrels 150, 160. The mandrel head 190 on each side of the head tube mandrel 150 is left uncovered so that, after the frame 25 is cured, each mandrel head 190 defines one access opening 140.

The head tube, top tube, and down tube mandrels 150, 155, 160 are assembled by connecting the top tube mandrel 155 to the first mandrel post 175 and connecting the down tube mandrel 160 to the second mandrel post 180. The assembled head tube, top tube, and down tube mandrels 150, 155, 160 cooperate to define a flexible mandrel assembly to which the cable routing mandrels 165 are attached.

With reference to FIG. 4A, the cable routing mandrels 165 are wrapped with one or more layers of first fibrous material 195 (e.g., carbon fiber-epoxy prepreg, uncured fiber matrix composite, etc.) until a desired thickness of material is achieved. During this process, the first fibrous material 195 is not wrapped around the mandrel heads 190; instead, at least a portion of the mandrel heads 190 is left exposed.

With reference to FIGS. 4B and 4C, the wrapped cable routing mandrels 165 are positioned in the recesses 185 in the assembled head tube and down tube mandrels 150, 160. In this position, the first fibrous material 195 is positioned between the head tube and down tube mandrels 150, 160 and the cable routing mandrel 165. Next, the flexible mandrel assembly and the cable routing mandrels 165 are wrapped with one or more layers of second fibrous material 200 (e.g., carbon fiber-epoxy prepreg, uncured fiber matrix composite, etc.) until a desired thickness of second fibrous material 200 is achieved. The first and second fibrous materials 195, 200 are uncured prior to placement in the curing tool 145. As used herein, the term "uncured" means that the material is not fully cured (i.e. the material could be uncured or partially cured). The wrapped mandrel assembly defines a pre-form layup that can be placed in the curing tool 145 to form the frame assembly 25a. It will be appreciated that FIG. 4C illustrates the mandrel assembly during the wrapping process (i.e. before the wrapping process is completed).

With reference to FIG. 4D, the second fibrous material 200 substantially defines the outer frame wall 130 when the frame assembly 25a is cured, and the first fibrous material 195 and the second fibrous material 200 cooperatively define the portion of the outer frame wall 130 where the fibrous materials overlay each other. That is, the first fibrous material 195 and the second fibrous material 200 partially overlap each other along portions of the down tube 45. As illustrated, the first fibrous material 195 that is positioned or sandwiched between the down tube mandrel 160 and the cable routing mandrels 165 defines the inner wall 135 of the cable passageways 125 when the frame assembly 25a is cured.

Each of the head tube mandrel 150, the top tube mandrel 155, and the down tube mandrel 160 is hollow. When the mandrels 150, 155, 160, 165 are assembled, an inflatable bladder 205 (e.g., nylon bag) is inserted and fed into the hollow of each mandrel 150, 155, 160 to assist with forming the frame 25. The illustrated bladder 205 is inserted into the mandrels 150, 155, 160 via an opening 210 in the down tube mandrel 160 before the layup or wrapping process begins. That said, the bladder 205 can be inserted into the mandrels 150, 155, 160 at any time prior to curing the first and second fibrous materials 195, 200 (e.g., before or after wrapping the mandrels, after the wrapped mandrel assembly is placed in the curing tool 145 and before curing the first and second fibrous materials 195, 200). Also, more than one bladder can be used to assist with forming the frame 25. For example, a first bladder can extend through the down tube mandrel 160 and the bottom half of the head tube mandrel 150, and a second bladder can extend through the top tube mandrel 155 and the top half of the head tube mandrel 150. Other variations of bladder positioning can also be used.

Figure 4E:
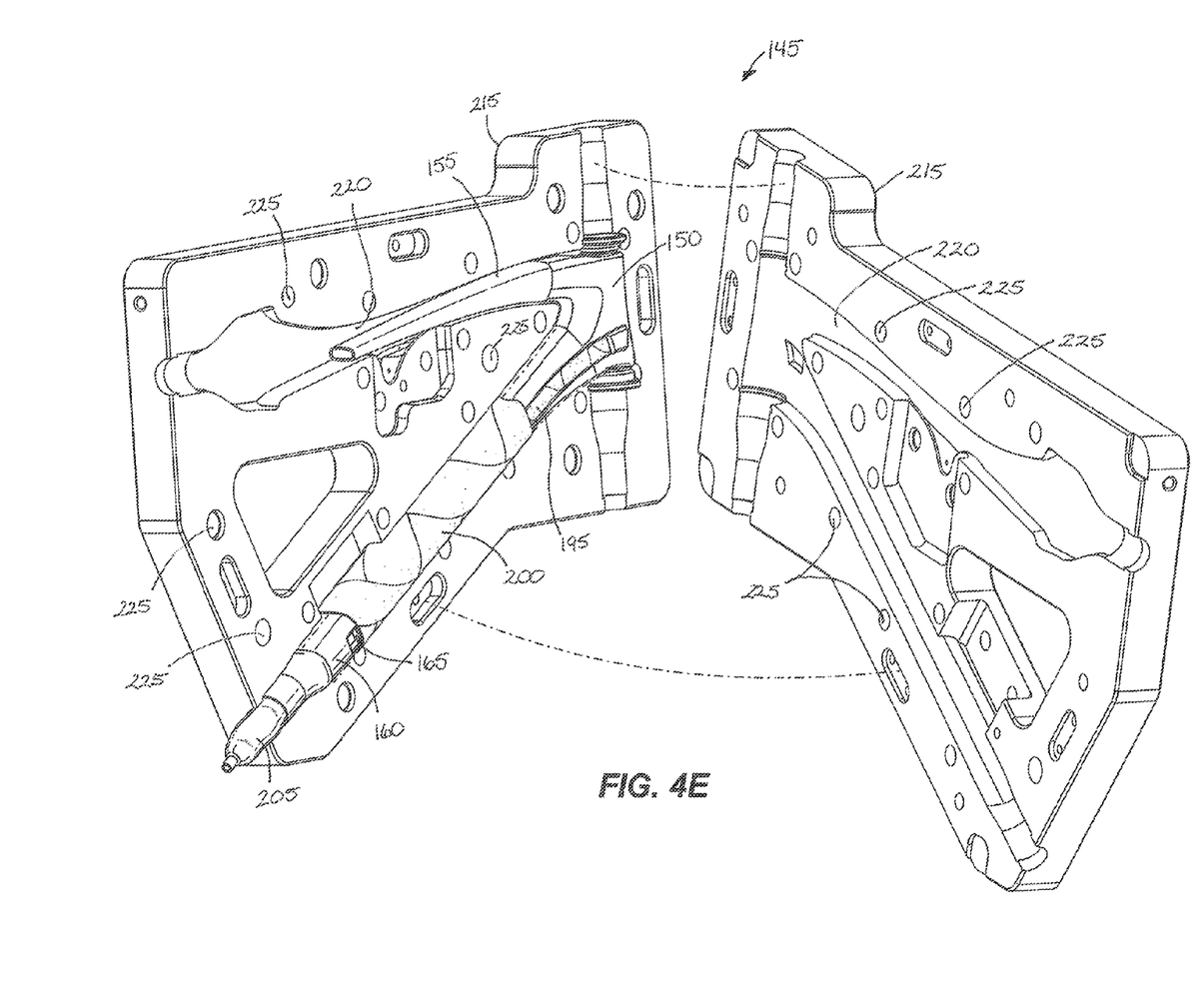
FIG. 4E is an exploded perspective view of two halves of a curing tool and the preform layup disposed in one half of the curing tool.

Referring to FIG. 4E, curing tool 145 includes two mold halves 215 each defining a frame pocket 220. The frame pockets 220 cooperatively define the outer surfaces of the frame 25 after the frame 25 is cured. The mold halves 215 also include a plurality of holes 225 that are used to align and/or secure the mold halves 215 to each other after the wrapped mandrel assembly is placed in the curing tool 145. FIG. 4E illustrates the partially wrapped mandrel assembly of FIG. 4C positioned in one of the frame pockets 220, although it should be understood that the mandrel assembly will be fully wrapped prior to placement in the curing tool 145 when forming the frame 25.

After the wrapped mandrel assembly is positioned in the curing tool 145, the mold halves 215 are secured to each other. The bladder 205 is accessible from outside the curing tool 145 so that the bladder 205 can be inflated to expand the head tube mandrel 150, the top tube mandrel 155, and the down tube mandrel 160 within the frame pockets 220. The down tube mandrel 160 and the cable routing mandrels 165 cooperate with each other and have sufficient rigidity to maintain desired internal features of the down tube 45 during the curing process. With the bladder 205 inflated, heat is applied to the curing tool 145 to produce the cured frame assembly 25a. After the curing process is complete, the cured frame assembly 25a is removed from the curing tool 145.

To remove the mandrels 150, 155, 160, 165 from the frame assembly 25a, the bladder 205 is deflated and removed from the head tube, top tube, and down tube mandrels 150, 155, 160. When the bladder 205 is deflated, the flexible head tube, top tube, and down tube mandrels 150, 155, 160 contract from the cured outer frame wall 130 and the inner wall 135 so that a gap exists between the mandrels 150, 155, 160 and the walls 130, 135, making it easier to remove the mandrels 150, 155, 160.

Figure 5:
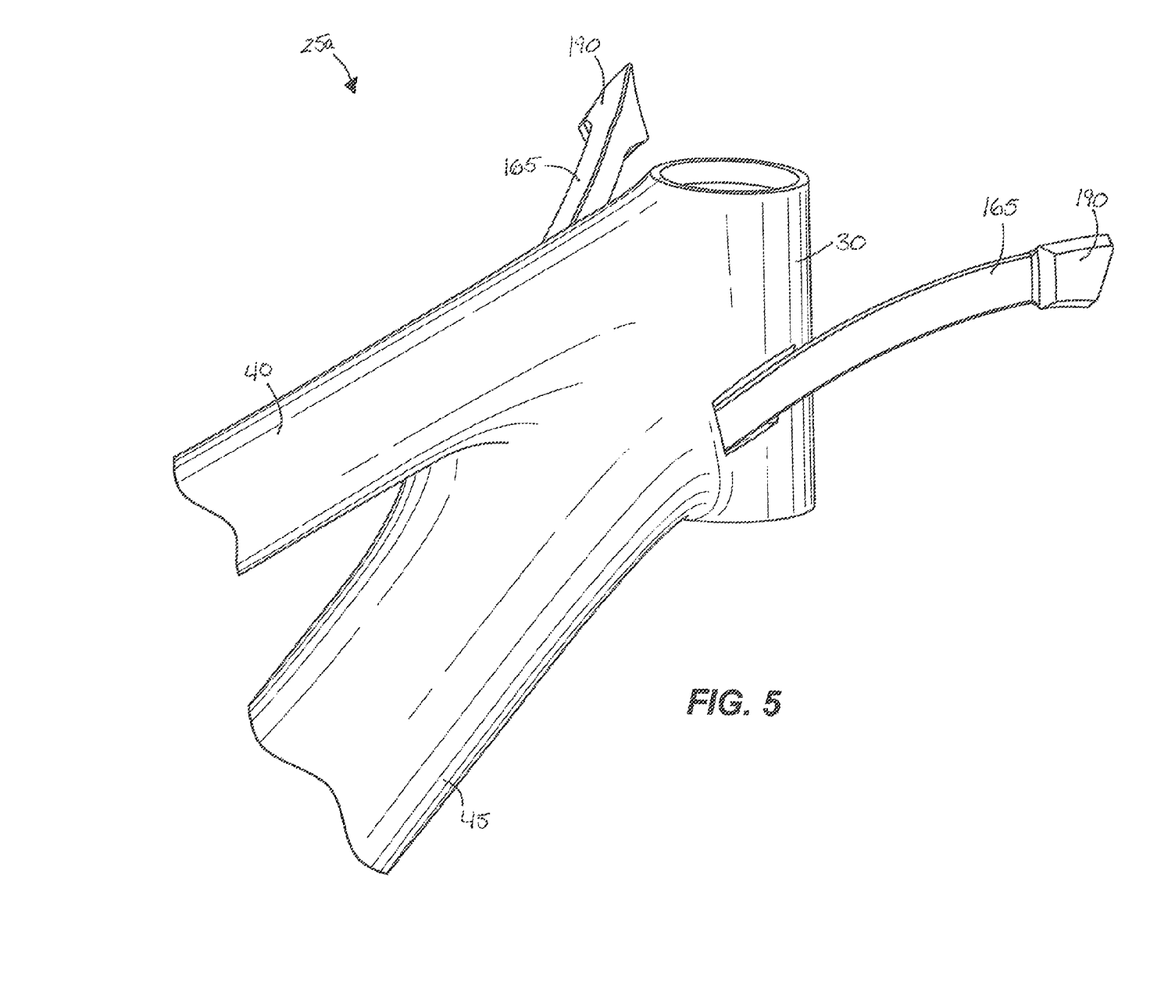
FIG. 5 is a perspective view of the frame portion after curing the fibrous material and illustrating the cable routing mandrels partially removed.
Figure 6:
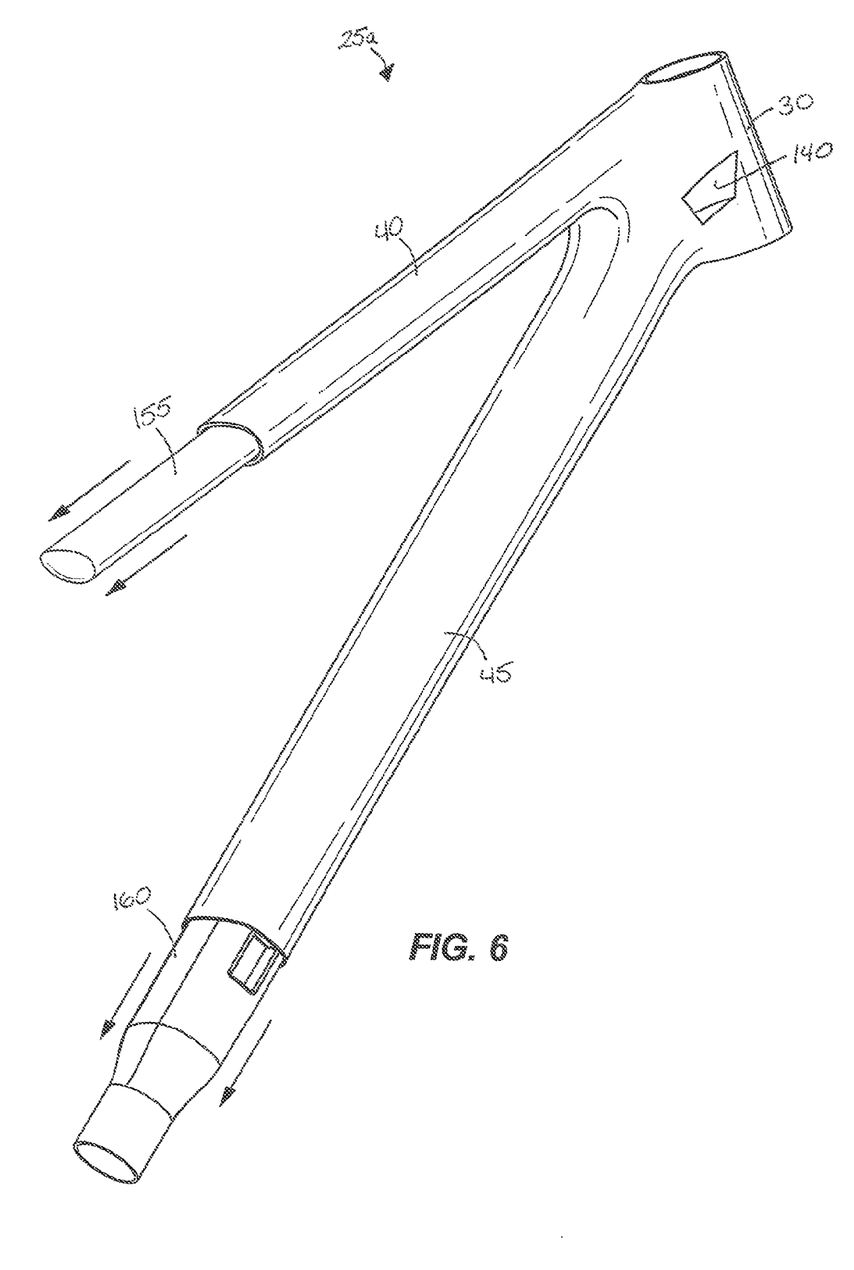
FIG. 6 is a perspective view of the frame portion after curing the fibrous material and illustrating the top tube and down tube mandrels partially removed.

The head tube, top tube, and down tube mandrels 150, 155, 160 can be removed from the frame assembly 25a before or after the cable routing mandrels 165 are removed. The head tube mandrel 150 (or mandrel halves) can be removed via the top or bottom opening in the head tube 30. With reference to FIG. 6, the top tube mandrel 155 is removed by pulling the mandrel 155 rearward out of top tube portion of the frame assembly 25a. Similarly, the down tube mandrel 160 is removed from the frame assembly 25a by pulling the mandrel 160 rearward out of the down tube 45. As illustrated in FIG. 5, the cable routing mandrels 165 are removed from the frame assembly 25a by pulling on the exposed mandrel heads 190. The mandrels 165 slide out of the formed cable passageways 125 in large part due to the low-friction material that comprises the mandrels 165.

The cables can be routed through the cable passageways 125 via the access openings 140 after the frame 25 is formed. By routing the cables 100a, 100b, 120b internally within the down tube 45, the cables 100a, 100b, 120b are protected from abrasion and wear. In addition, by integrating the cable passageways 125 into the down tube 45 and separating the passageways 125 from the interior of the down tube 45, the cables 100a, 100b, 120b can be more easily routed within the frame 25 while minimizing noise that could be caused by cable movement during riding.

Various features of the invention are set forth in the following claims.

The invention claimed is:

1. A method of making a portion of a bicycle frame comprising:
    positioning a low-friction mandrel adjacent a flexible mandrel with a first fibrous material in between the low-friction mandrel and the flexible mandrel;
    wrapping the flexible mandrel and low-friction mandrel with second fibrous material;
    inserting the flexible mandrel and low-friction mandrel into a mold;
    curing the second fibrous material to produce a cured assembly;
    withdrawing the cured assembly from the mold; and
    removing the low-friction mandrel from the cured assembly to produce an internal passageway.

2. A method as claimed in claim 1, wherein positioning includes wrapping the low-friction mandrel with the first fibrous material.

3. A method as claimed in claim 1, wherein the low-friction mandrel comprises polytetrafluoroethylene (PTFE).

4. A method as claimed in claim 1, wherein the first fibrous material comprises composite fibers pre-impregnated with an uncured matrix.

5. A method as claimed in claim 1, wherein the flexible mandrel comprises silicone.

6. A method as claimed in claim 1, wherein the flexible mandrel comprises a recess and wherein positioning includes inserting the low-friction mandrel into the recess of the flexible mandrel.

7. A method as claimed in claim 6, wherein the low-friction mandrel has a cross sectional shape that substantially matches a cross-sectional shape of the recess.

8. A method as claimed in claim 1, wherein the second fibrous material comprises composite fibers pre-impregnated with an uncured matrix.

9. A method as claimed in claim 1, wherein the flexible mandrel comprises a hollow interior, and wherein the method further includes inserting an inflatable bladder into the hollow interior and, prior to the curing step, inflating the bladder to press the second fibrous material outward toward the mold.

10. A method as claimed in claim 1, wherein a portion of the low-friction mandrel extends beyond an end of the first fibrous material, and wherein removing the low-friction mandrel comprises pulling the low-friction material out of the internal passageway.

11. A method as claimed in claim 1, wherein both of the first and second fibrous materials comprise an uncured fiber-matrix composite, and wherein curing the second fibrous material includes curing both the first and second fibrous materials.

12. A method of making a portion of a bicycle frame comprising:
    positioning a low-friction mandrel having a non-round sectional shape adjacent an inflatable bladder with a first fibrous material in between the low-friction mandrel and the inflatable bladder;
    inserting the low-friction mandrel and inflatable bladder into a mold such that a second fibrous material surrounds the low-friction mandrel and the inflatable bladder;

inflating the bladder to press the second fibrous material outward toward the mold;

curing the second fibrous material to produce a cured assembly;

withdrawing the cured assembly from the mold; and removing the low-friction mandrel from the cured assembly to produce an internal passageway.

13. A method as claimed in claim 12, wherein the step of positioning the low-friction mandrel adjacent the inflatable bladder includes inserting the inflatable bladder into a hollow of a flexible mandrel, and prior to the inserting step, positioning the flexible mandrel intermediate the inflatable bladder and the low-friction mandrel.

14. A method as claimed in claim 13, wherein prior to the step of inserting the low-friction mandrel and the inflatable bladder into the mold, the flexible mandrel and low-friction mandrel are wrapped with the second fibrous material.

15. A method as claimed in claim 13, wherein the flexible mandrel defines a recess, and wherein positioning includes inserting the low-friction mandrel into the recess of the flexible mandrel.

16. A method as claimed in claim 12, wherein the low-friction mandrel comprises a first and second longitudinal portion, and the step of removing the low-friction mandrel includes pulling the first and second longitudinal portions in opposing directions to produce the internal passageway.

\* \* \* \* \*